May 29, 1956  J. L. MATASOVIC  2,747,607
PRESSURE REGULATOR
Filed Dec. 12, 1951
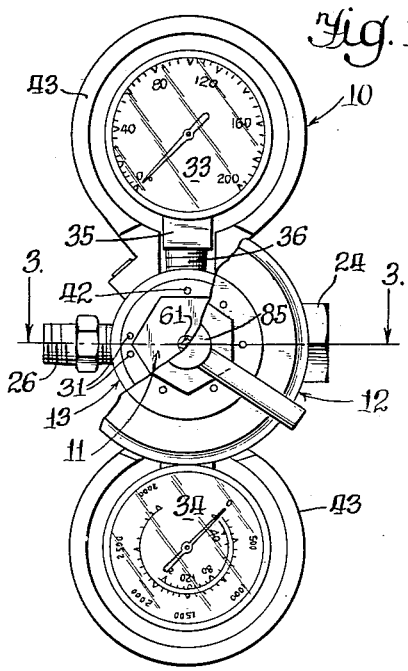
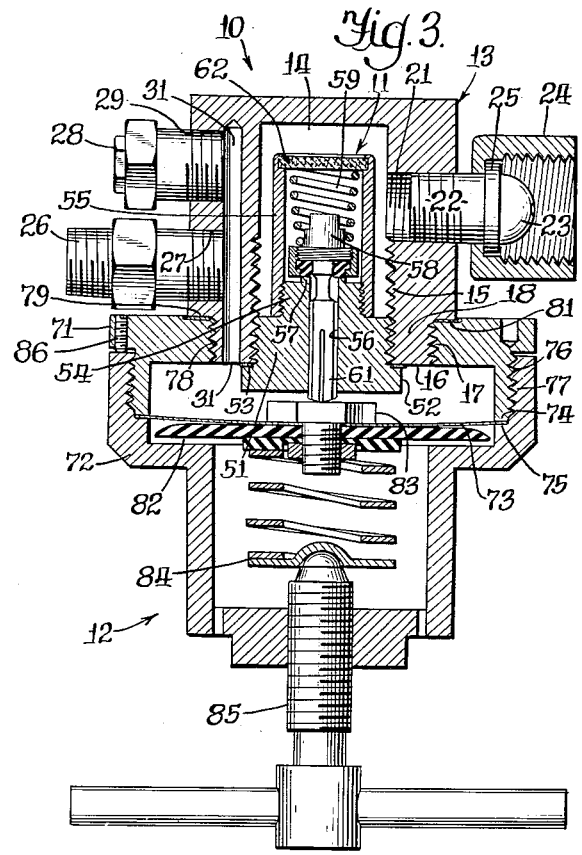
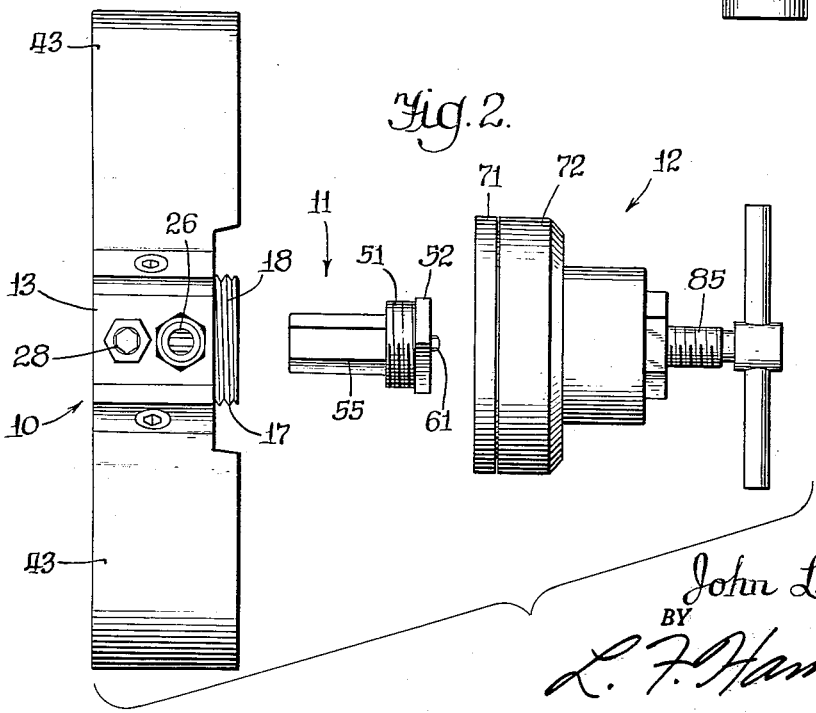
INVENTOR.
John L. Matasovic
BY
L. F. Hammond
Atty.

United States Patent Office 2,747,607
Patented May 29, 1956

2,747,607

PRESSURE REGULATOR

John L. Matasovic, Chicago, Ill.

Application December 12, 1951, Serial No. 261,205

1 Claim. (Cl. 137—505.42)

This invention relates to pressure regulators and has specific reference to a reducing valve and pressure regulator suited to use with compressed oxygen, for example, in connection with welding equipment and the like.

It is a primary object of the present invention to provide an improved pressure regulator wherein the component parts of the regulator assembly are of unique design and construction, so that each of the principal component parts of the regulator are accessible separately and independently of the other components thereof. Thus, any necessary repairs, adjustments or inspections may be made without disturbing the critical relationships between the operating parts of the assembly, and without the possibility of admitting dust, grit or other foreign matter into any portions of the mechanism which would be adversely affected thereby.

More specifically, this important object of the invention resides in the provision of a pressure regulator assembly wherein the regulator may be opened for service or inspection of the diaphragm or valve assembly without removing the diaphragm from its mountings and without disturbing the seal around the marginal edges of the diaphragm. It also permits complete replacement of the high pressure gas valve of the assembly without exposing the highly polished sealing surfaces of the valve to dust, grit or foreign matter, even though the replacement be made in surroundings where dust is prevalent. Thus, the present invention permits servicing of the regulators in actual use in the field, at the same time effectively preventing entrance of dust or foreign particles to the delicate surfaces of the equipment. This arrangement also precludes the possibility of accidental nicks or scratches on the delicate surfaces of the valve and diaphragm seat.

A further object of the invention resides in the provision of an improved and simplified pressure reducing valve of such unique design and construction that it becomes commercially practical to manufacture the portions of the unit subjected to the greatest physical stresses (that is, the mounting portions and the portion of the device directly subjected to the high pressure gas) of solid bar stock, as distinguished from castings, etc. The result is that the high pressure components of the unit may be manufactured by relatively economical automatic screw machine operations, yet the completed product will have greater strength and freedom from flaws than is afforded by cast metal parts.

Another important object of the present invention is the provision of a pressure reducing and regulating valve wherein the inlet and outlet connections, the pressure gauges, and the working components of the regulator are all arranged and so related to each other that either the internal valve mechanism or the diaphragm housing and its working parts can be removed, inspected, serviced or replaced without the necessity of disturbing the inlet or outlet lines, nor any of the pipe or hose line connections associated with the unit.

The foregoing objects are accomplished in the invention disclosed herein by a pressure reducing and regulating valve assembly of unique mechanical construction and composed of three separable but self-contained subassemblies comprising the main body member, the detachable diaphragm assembly, and the removable high pressure valve assembly, respectively. The arrangement is such that the main body member is supported directly on an inlet fitting, and serves as the mounting and sole support of the gauges and other components of the regulator. The detachable diaphragm assembly includes a housing or shell which is entirely independent of the inlet or outlet fittings of the regulator, and mounted upon but removable from the main body member so that the diaphragm assembly may be completely removed for inspection of the diaphragm, etc., or for replacement of the valve assembly without removing the diaphragm from its mountings or loosening the clamping mechanism therefor, and consequently without permitting any possibility of nicking, scraping or otherwise damaging the diaphragm sealing surfaces and without permitting access of any dust, grit or foreign particles to such surfaces. Similarly, the valve assembly is so designed that the high pressure valve seat, together with its closing spring, actuating pin and gas filter may be bodily removed and replaced as a unit without exposing the seating surfaces of the valve so that these delicate surfaces are at all times protected against accidental nicks, scrapes or scratches, and are at all times effectively shielded against the entrance of dirt, grit or other foreign matter. Moreover, these results are accomplished in a valve unit which may be disassembled, inspected and serviced without the need of any special or unusual tools or equipment.

In its preferred form, the invention consists of a regulator assembly including a high pressure body turned from a solid piece of bar stock and arranged to serve as the sole mounting for the pressure gauges associated with the regulator as well as for the valve assembly and the diaphragm assembly. This high pressure body has a unique arrangement of its high pressure gas cavity and of its inlet, outlet, and gauge ports and passages, whereby it is specifically adapted to coact with the bodily-removable dust sealed valve assembly and the separable diaphragm assembly, to bring about the requisite coaction between these individual subassemblies of the device.

The present preferred embodiment of the invention is illustrated in the drawings herein, wherein:

Figure 1 is a front elevational view of a pressure regulator according to these teachings, with the diaphragm housing partially broken away to show the internal construction of the assembly;

Figure 2 is an exploded view of the regulator assembly, showing the main body member, the valve subassembly and the diaphragm subassembly disassembled from each other; and Figure 3 is an enlarged detail plan sectional view taken substantially on the plane of the line 3—3 of Figure 1.

The complete regulator unit is composed of three separate but interrelated subassemblies consisting of the high pressure assembly 10, the valve subassembly 11 and the diaphragm subassembly 12. These separable subassemblies are normally assembled to each other in the manner illustrated in Figure 3, but may be bodily detached from each other as indicated in Figure 2 of the drawings without the necessity of in any way disassembling these three component parts of the unit. This unique construction results in important practical advantages in manufacturing and at the same time gives rise to improvements in safety and facilitates quick and efficient inspection, servicing and repair in the field, as will appear.

The high pressure assembly

The high pressure assembly comprises a main body portion 13 which is preferably turned from solid bar stock in an automatic screw machine operation. This member is preferably formed of a short length of solid cylindrical or hexagonal bar, with a relatively large and deep bore 14 drilled from one end to provide a high pressure gas cavity, and with an internal screw thread 15 at the mouth of the bore to secure the valve subassembly therein. As shown, the body has a smooth flat annular sealing surface 16 surrounding the screw threaded mouth. It is this marginal sealing surface against which the sealing flange of the valve assembly 11 is to be seated, as will be described hereinafter. The high pressure body 13 also includes external screw threads 17 formed concentrically with the threads 15 and the central bore 14 and on the outer surface of a projecting boss 18 upon which the diaphragm subassembly 12 of the assembly may be mounted.

The high pressure main body member 13 has, on one of its exterior side walls, an inlet (high pressure) port 21 into which an inlet nipple 22 is threaded. The nipple 22 is ordinarily provided with a convexly surfaced gas seal 23 and the entire regulator assembly is conveniently mounted by clamping this inlet nipple onto the pipe fittings of a compressed gas cylinder. Conventionally, this is done by means of a threaded coupling nut 24, drawing up the nipple 22 by the flange 25.

The main body member 13 is also preferably provided with an outlet fitting 26 threaded into the port 27, on the opposite side wall. A safety valve 28 is also threaded into a port 29 adjacent the outlet fitting. It is to be noted, however, that while the inlet port 21 communicates directly with the central cavity 14, the ports 27 and 29 terminate short of the central cavity, but are in communication with a drilled outlet passageway 31 passing through the projection portion 18 of the main body member (that is, between the internal threads 15 and the external threads 17) and terminating in an outlet aperture on the flat face surface 16 of the main body member. If desired, there may be two or more of the passages 31 parallel to each other, as indicated in Figure 1.

The high pressure body also serves as a mounting for a pair of pressure gauges 33 and 34. The low pressure gauge 33 has a squared shank portion 35 terminating in a nipple 36 threaded directly into the body 13. The high pressure gauge 34 has a similar squared shank portion and nipple threaded into the opposite side of the body 13.

The high pressure gauge is in communication with the central high pressure cavity 14. The low pressure gauge 33 communicates with a drilled passageway 42 which extends outwardly to an aperture in the sealing surface 16, so that the gauge 33 is in communication with the low pressure gas acting upon the diaphragm within the shell subassembly 12. As shown, each of these gauges are surrounded by protective hoods 43 to protect them against accidental impact.

*The valve subassembly*

The valve subassembly 11 comprises, in its essential parts, a closure member for the high pressure cavity 14, together with a high pressure valve. The subassembly shown is a completely self-enclosed, bodily-removable unit having a cap carried on the closure plug and forming a protective casing or shell surrounding the entire valve and so designed as to exclude dust, grit and foreign particles from the delicate, smoothly polished sealing surfaces of the valve, even when the valve subassembly is completely removed from the main body of the regulator. The closure member for the high pressure cavity comprises a threaded plug 51 fitted into the threads 15 at the mouth of the high pressure cavity 14. The plug 51 has an exterior hexagonal flange 52 overlying part of the flat sealing surface 16 and a gasket 53 may be provided under the flange 52 to effect an adequate seal of the chamber 14. The inside end of the plug 51 has a threaded boss 54 on which a cylindrical cap 55 is carried. The closure plug 51 is imperforate except for a central bore 56, which terminates in an annular nozzle 57 on the boss 54. A valve seat 58 is arranged to seat against the nozzle 57 to close the bore 56, and a spring 59 is provided to hold the valve seat in closed position. The valve seat 58 can be lifted from the nozzle 57 by an actuating pin 61, which extends through the bore 56 and projects beyond the hexagon flange 52 so that the valve seat may be raised and lowered by the movement of the regulator diaphragm, as will be described.

The cylindrical cap 55 entirely surrounds the valve nozzle and its seat and holds the spring 59 in partially compressed position, so that the valve seat 58 is held firmly against the sealing surfaces of the nozzle 57 unless lifted therefrom by the actuating pin 61. The cap 55 is imperforate except for a porous filter disc 62 of powdered and sintered stainless steel, which is affixed in the cap 55 at the end thereof. The filter disc 62 has a mean pore opening of about 65 microns so that it passes high pressure gas to the valve, but effectively excludes any dust or foreign particles. Also, since the valve seat is held closed when the subassembly is bodily removed, the valve nozzle surfaces are protected against dust, dirt or accidental damage at all times, even when replacement of the entire valve subassembly is required. It follows that a defective valve may be quickly and easily replaced in a regulator in use in the field, with assurance that no dust or grit can reach the nozzle surfaces of the replacement assembly as it is put in position.

*The diaphragm subassembly*

The diaphragm subassembly 12 consists essentially of a diaphragm and a pair of housings comprising a circular base plate 71 and a hollow shell 72. The housings 71 and 72 coact to form a mounting for the thin metal diaphragm 73, the thin marginal edges of which are seated between smoothly finished sealing surfaces 74 and 75. The diaphragm is clamped in position by screw threads 76 on the base plate 71 and coacting threads 77 on the shell 72. The base plate 71 has a central aperture having additional screw threads 78 by which the entire diaphragm subassembly 12 is mounted upon the threads 17 of the projecting boss or mounting portion 18 of the main body member 13. An annular sealing surface is provided on the back of the base plate 71 to provide a gas tight seal against a coacting marginal sealing surface 79 of the main body member and, if desired, a resilient gasket 81 may be provided.

The diaphragm 73 is provided with a pressure plate 82 and clamping nut 83 positioned to engage the pin 61 so that the valve assembly is controlled by variations of pressure acting on the diaphragm. It is contemplated that a coiled compression spring 84 and threaded regulating screw 85 may be provided to permit adjustment of the spring, as is conventional in reducing valves.

From the foregoing it will be apparent that the present teachings provide a reducing valve and pressure regulator wherein the principal component parts comprise separate, self-contained subassemblies, bodily removable from the regulator and so related to each other that the regulator may be dismantled sufficiently for inspection of the diaphragm, for example, without breaking the seal around the marginal edges of the diaphragm nor exposing the delicate peripheral edge of the diaphragm to accidental damage. Also, the smoothly finished sealing surfaces are at all times protected against grit, dust, etc., and the diaphragm may be inspected without opening the housing in such a manner that these delicate surfaces could be accidentally scratched, scraped or otherwise marred.

The arrangement is also such that the entire valve subassembly may be removed and replaced without removing the diaphragm from its marginal mountings, and the valve subassembly is so arranged that it is completely enclosed and self-sealing when removed from the main body of the unit.

It will also be apparent that the main body of the assembly is of stronger, more rugged construction than in conventional regulators, yet is more compact. Moreover, it not only serves as the mounting means and sole support for the valve and diaphragm subassemblies, but is also arranged so that it carries all of the inlet fittings, outlet fittings, pressure gauges, safety valve, etc. Thus, any necessary inspection or repairs of the diaphragm subassembly or valve subassembly may be conveniently and quickly made without the necessity of detaching any inlet or outlet fittings, and without the need of removing the gauges or gauge guards from their fixed positions on the main body. This unique construction simplifies servicing of the regulators and speeds any necessary repair or replacement of parts.

Having thus described my invention, what I claim as new and desire to secure by United States Letters Patent is:

In a pressure regulator, in combination, a high pressure body consisting of a single integral metal bar, with a high pressure cavity comprising a central bore extending inwardly into said bar from one end thereof, a mounting boss immediately surrounding said bore, and a relatively narrow annular face bordering said cavity; an inlet fitting and an outlet fitting on said high pressure body with a gas inlet port extending from the inlet fitting to the high pressure cavity and a gas outlet port extending from the outlet fitting to said annular face; a unitary, bodily detachable, self-contained diaphragm housing entirely independent of and separate from the aforementioned inlet and outlet fittings and comprising a base secured to and supported wholly upon the aforementioned base; with a cavity in the base, a detachable shell, clamping means securing the base and shell to each other, and a diaphragm secured therebetween whereby said diaphragm and cavity define a low pressure chamber; together with a unitary, removable, self-contained valve unit comprising a plug positioned in the high pressure cavity and sealing the open end thereof, said valve assembly including a valve and valve seat enclosed by and held in assembled relation with respect to each other by a dust cap affixed to and supported wholly by said plug, with an operating pin on said valve unit extending directly to the aforementioned diaphragm whereby removal of the diaphragm housing from the high pressure body will afford access to the valve unit for removal and replacement of the valve and valve seat thereof without disturbing connections attached to the inlet and outlet fittings or loosening the diaphragm from its housing.

References Cited in the file of this patent

UNITED STATES PATENTS

| | | |
|---|---|---|
| 660,872 | Taylor | Oct. 30, 1900 |
| 1,038,455 | Stoner | Sept. 10, 1912 |
| 1,172,765 | Carroll et al. | Feb. 22, 1916 |
| 1,325,128 | Wegner | Dec. 16, 1919 |
| 1,771,187 | Murray | July 22, 1930 |
| 2,071,986 | Quane | Feb. 23, 1937 |
| 2,096,671 | De Matte | Oct. 19, 1937 |
| 2,518,852 | Annin | Aug. 15, 1950 |
| 2,595,156 | Matasovic | Apr. 29, 1952 |
| 2,612,728 | Jacobson | Oct. 7, 1952 |
| 2,666,278 | Matasovic | Jan. 19, 1954 |

FOREIGN PATENTS

| | | |
|---|---|---|
| 34,404 | France | June 18, 1929 |
| 468,024 | Great Britain | 1937 |